United States Patent [19]
Barber

[11] Patent Number: 6,029,072
[45] Date of Patent: *Feb. 22, 2000

[54] PORTABLE TELEPHONE WITH TERMINAL MODE FACILITY

[75] Inventor: Clifton J. Barber, Clayton County, Ga.

[73] Assignee: Oki Telecom, Inc., Suwanee, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,170

[22] Filed: Jan. 24, 1997

Related U.S. Application Data

[60] Provisional application No. 60/010,594, Jan. 25, 1996.

[51] Int. Cl.[7] ......................................................... H04B 1/00
[52] U.S. Cl. ........................... 455/557; 455/556; 455/566
[58] Field of Search ..................................... 455/550, 556, 455/557, 566, 69, 418, 67.1, 466; 379/354

[56] References Cited

U.S. PATENT DOCUMENTS

| | | | |
|---|---|---|---|
| 4,065,640 | 12/1977 | Rouiller | 179/7.1 TP |
| 4,394,649 | 7/1983 | Suchoff et al. | 379/354 |
| 4,680,787 | 7/1987 | Marry | 379/63 |
| 4,775,997 | 10/1988 | West, Jr. et al. | 379/58 |
| 4,850,006 | 7/1989 | Sasaki et al. | 379/58 |
| 4,852,146 | 7/1989 | Hathcock et al. | 379/58 |
| 4,989,230 | 1/1991 | Gillig et al. | 379/59 |
| 5,020,090 | 5/1991 | Morris | 379/58 |
| 5,043,736 | 8/1991 | Darnell et al. | 342/357 |
| 5,081,667 | 1/1992 | Drori et al. | 379/59 |
| 5,109,402 | 4/1992 | Anderson et al. | 379/58 |
| 5,109,541 | 4/1992 | Park | 455/89 |
| 5,128,981 | 7/1992 | Tsukamoto et al. | 455/567 |
| 5,247,564 | 9/1993 | Zicker | 455/557 |
| 5,322,991 | 6/1994 | Hanson | 455/557 |
| 5,451,839 | 9/1995 | Rappaport et al. | 455/67.1 |
| 5,479,475 | 12/1995 | Grob et al. | 455/557 |
| 5,479,480 | 12/1995 | Scott | 455/33.1 |
| 5,487,175 | 1/1996 | Bayley et al. | 455/466 |
| 5,590,406 | 12/1996 | Bayley et al. | 455/557 |

*Primary Examiner*—Edward F. Urban
*Assistant Examiner*—Thuan T. Nguyen
*Attorney, Agent, or Firm*—Thomas, Kayden, Horstemeyer & Risley, LLP

[57] ABSTRACT

A portable cellphone, with or without its docking system, is integrated as an accessory to a host system such as by providing a terminal interface (terminal mode) to the host for the purpose of user interface and control of the host. The portable also provides radio frequency (RF) communication capability which is integrated and controlled by the application running on the host. While functioning in a terminal mode of operation, the portable generates and communicates to the host, through the reverse data line, data representing manipulation of the portable keypad. Likewise, the portable relinquishes control of the portable display to the host according to display control commands received by the portable from the host on the forward data line. A user is also provided the ability to use the portable to notify the host through the reverse data line that the portable is available for use in terminal mode.

14 Claims, 8 Drawing Sheets

PORTABLE TELEPHONE WITH TERMINAL MODE FACILITY

CROSS-REFERENCE TO RELATED APPLICATION

This application claims priority under 35 U.S.C. § 119 to U.S. Provisional patent application Ser. No. 60/010,594, filed Jan. 25, 1996.

BACKGROUND OF THE INVENTION

The present invention relates generally to the field of telecommunications, and more specifically, to the field of integrating a portable telephone with other elements in a vehicle.

Many portable telephones, referred to simply as "portables," have input/output (I/O) interfaces which allow them to be coupled to, and to communicate with, accessory products such as car kits (including portable telephone holders, speakers, microphones, external antennas, etc.), chargers, cigarette lighter adapters, external keypads/control units, etc. The I/O interface is normally a serial databus interconnection which accommodates data communications. For example, some portables receive keystrokes and other limited information for portable operations from accessories on an ACCESSORY-to-PORTABLE data line (also called a "forward" data line) and, likewise, transmit display commands and status information to accessories on a PORTABLE-to-ACCESSORY data line (also called a "reverse" data line). This implementation is limiting from the perspective that it does not provide a way for other devices to tap into various other resources and capabilities of the portable.

SUMMARY OF THE INVENTION

In considering the limitation described above, it has been determined that the value of a portable telephone is substantially increased when the portable, with or without its docking system, provides a terminal mode facility for being integrated itself as an accessory to a host system, such as by effectively becoming a terminal interface to the host for the purpose of user interface and control. In other words, while functioning in a terminal mode of operation, the portable generates and communicates to the host, through the reverse data line, data representing manipulation of the portable keypad. Likewise, the portable relinquishes control of the portable display to the host according to display control commands received by the portable from the host on the forward data line.

According to the preferred embodiments of the present invention, a user is provided the ability to use the portable to notify the host through the reverse data line that the portable is available for use in terminal mode. However, the portable then resumes conventional operation until receiving a command from the host through the forward data line telling the portable to enter into its terminal mode. After entering into terminal mode, the portable's keypad and display effectively begin operating as a so-called "dumb" terminal. Thus, unless the design of a particular host application provides a key-activated exit capability, the portable must then remain in terminal mode until either the portable is requested by the host to discontinue terminal mode operation or until the portable detects an incoming telephone call, in which case terminal mode is immediately terminated. After the telephone call is completed, it is the host's responsibility to restart terminal mode in the portable by again commanding the portable to enter into its terminal. In addition, during terminal mode, the portable also continues to internally process key press and key release information received on the forward data line, while preventing the results of such processing from appearing on its display. Nonetheless, the results of such processing (including, for example, display commands for external control units and status information) also continue to be output through the reverse data line. Furthermore, the portable also provides a radio frequency (RF) communication capability to the host so that the host is able to initiate telephone calls through the portable.

One type of an example application which benefits from the portable's terminal mode facility includes navigation systems where the portable keypad and display are used to allow the user to interface to and control the operations of the navigation system. Another example application includes a remote vehicle diagnostic monitor which enables a driver to link an in-vehicle engine and accessory control processor to a remote diagnostic center. Yet another application includes an emergency assist facility which links to an on-board location system, such as a global positioning system (GPS). The above example applications are illustrative of the present invention and are not meant to be construed as limiting the scope of possible other applications.

One object of the present invention is to provide a portable telephone with a terminal mode facility.

Another object of the present invention is to provide a portable which includes a readily accessible ability to communicate to a host key manipulation data and relinquish control of the portable display to the host according to display control commands received from the host.

Yet another object of the present invention is to provide a portable which exits a terminal mode promptly upon detecting an incoming call.

Yet another object of the present invention is to provide a portable with a terminal mode request function wherein the portable resumes non-terminal mode operation until receiving a host command instructing the portable to enter terminal mode.

Yet another object of the present invention is to provide a portable which must remain in terminal mode after activation of terminal mode until the portable is either allowed to exit terminal mode by the host or the portable detects an incoming call.

Yet another object of the present invention is to provide a portable telephone which, during a terminal mode of operation, functions as an attached interface accessory to other vehicle devices.

Still another object of the present invention is to provide a terminal mode apparatus as an accessory to a host.

Still another object of the present invention is to provide a display apparatus for a host.

Still another object of the present invention is to provide a keypad input device for a host.

Still another object of the present invention is to provide a user interface/RF engine accessory to vehicle accessory systems.

Other objects, features and advantages of the present invention will become apparent upon reading and understanding the present specification, when taken in conjunction with the accompanying drawings.

DETAILED DESCRIPTION OF THE PREFERRED EMBODIMENTS

Reference is now made to the drawings, and those embodiments of the invention here presented by way of illustration, wherein like reference numerals designate corresponding parts throughout the several figures.

The present invention enables an automotive manufacturer to easily and effectively integrate a portable, such as a portable cellular radio telephone (analog, digital, and dual-mode), personal communication devices, or other types of telephone devices which operate at radio or higher frequencies, in an in-vehicle accessory system developed by the automotive manufacturer. The present invention teaches a portable being used as a keypad input device, a display output device, and an RF I/O device for a system which interfaces through the portable's I/O interface.

Figure 1:
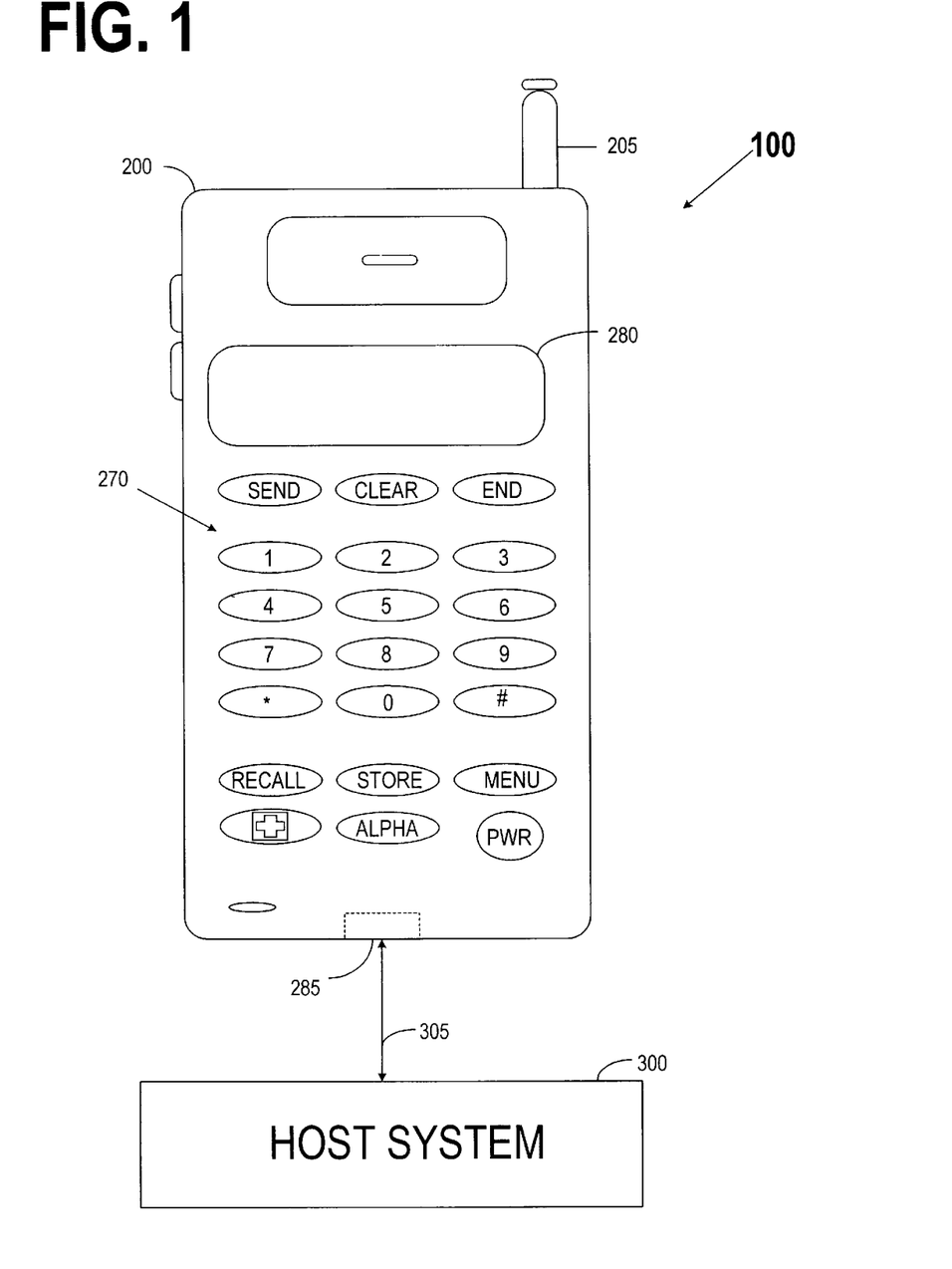
FIG. 1 schematically illustrates a basic view of a system in which a host system is coupled to a portable with a terminal mode facility in accordance with a first preferred embodiment of the present invention.

FIG. 1 schematically depicts a simplified view of a system 100 which is a first preferred embodiment in accordance with the present invention. System 100 includes, at least, a portable 200 coupled to an external host system 300 through an I/O port 285 and a line 305. Portable 200 also includes a keypad 270, a display 280 (such as a liquid crystal or other type of display), and an antenna 205. In this first preferred embodiment, a user is provided a method of causing the portable 200 to request a change of operating mode of the portable 200 from its normal functionality mode to a terminal mode (TM) by pressing a sequence of keys on keypad 270. In other acceptable implementations of the present invention (not shown), the user causes the same result by simply pressing a designed "terminal mode" or "TM" key on keypad 270. Once in TM, host 300 exerts independent control over display 280 and is the exclusive processor of keypad 270 data. However, indicator icon functions which indicate the status of call processing functions (In-Use, Roam, etc.) continue to be controlled normally by the portable. In TM, Key Press, Key Release, and Display commands are transferred between portable 200 and host system 300. The Key Press and Key Release commands may be generated either at keypad 270 or by host 300, while the Display commands are generated in host 300 to control the display output on display 280. Also in TM, host 300 has access to outgoing cellular telephone call features of portable 200 for making calls to access other remote systems or locations for sending or receiving information under instructions from host 300.

One example of a type of host system 300 is an on-board navigation system for an automobile or other vehicle which may be accessed by a user through portable 200 in TM mode. Accessing the features of the navigation system with, for example, menus displayed on display 280 is a function of the navigation (or other) system and the designed application being run by the navigation (or other) system.

Figure 2:
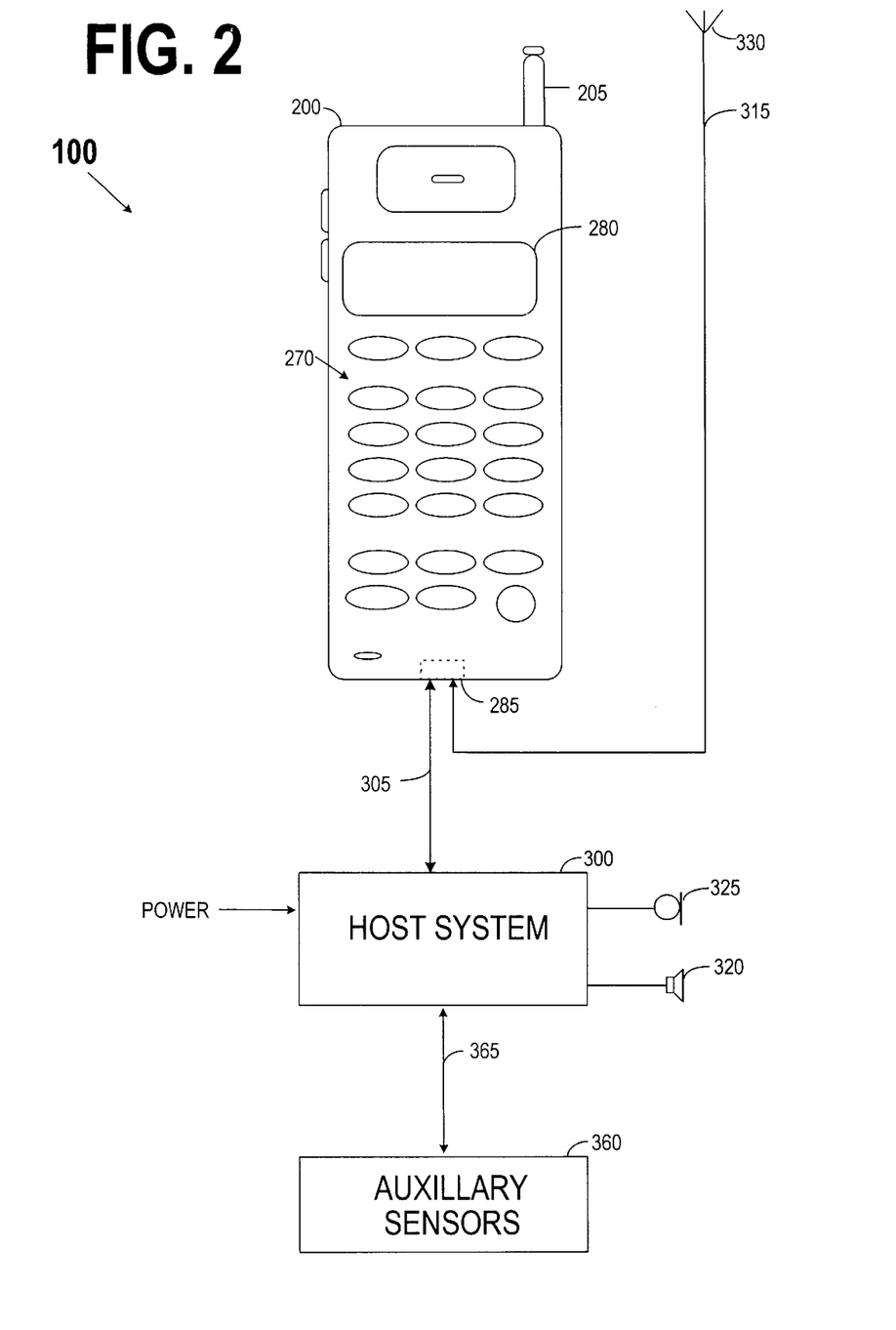
FIG. 2 schematically depicts a more detailed view of the system of FIG. 1.

FIG. 2 schematically depicts a more detailed view of the first preferred embodiment shown in FIG. 1. In this first preferred embodiment, portable 200 receives and transmits RF signals over RF line 315 through antenna 330. Line 315 is coupled to portable 200 through I/O port 285 and coupled to antenna 330, and may be an RF coaxial cable or any other line capable of propagating RF or higher frequency signals. According to this first preferred embodiment, host system 300 includes, at least, a speaker 320 and a microphone 325 which are used by a user during telephone calls. Speaker 320 and microphone 325 may be accessed by the user of system 100 instead of using the on-board microphone and speaker of portable 200. Moreover, in this first preferred embodiment, host 300 is coupled to auxiliary sensors 360 by line 365 to provide sensory input to, and output from, host 300 depending on the designed applications of host 300. Some examples of the types of sensors that may be used as auxiliary sensors 360 are described below. In this first preferred embodiment, the power to run the electronics (and electrical components) of host 300 is provided from the vehicle, and host 300 provides power to portable 200 as will be described in more detail below.

Figure 3:
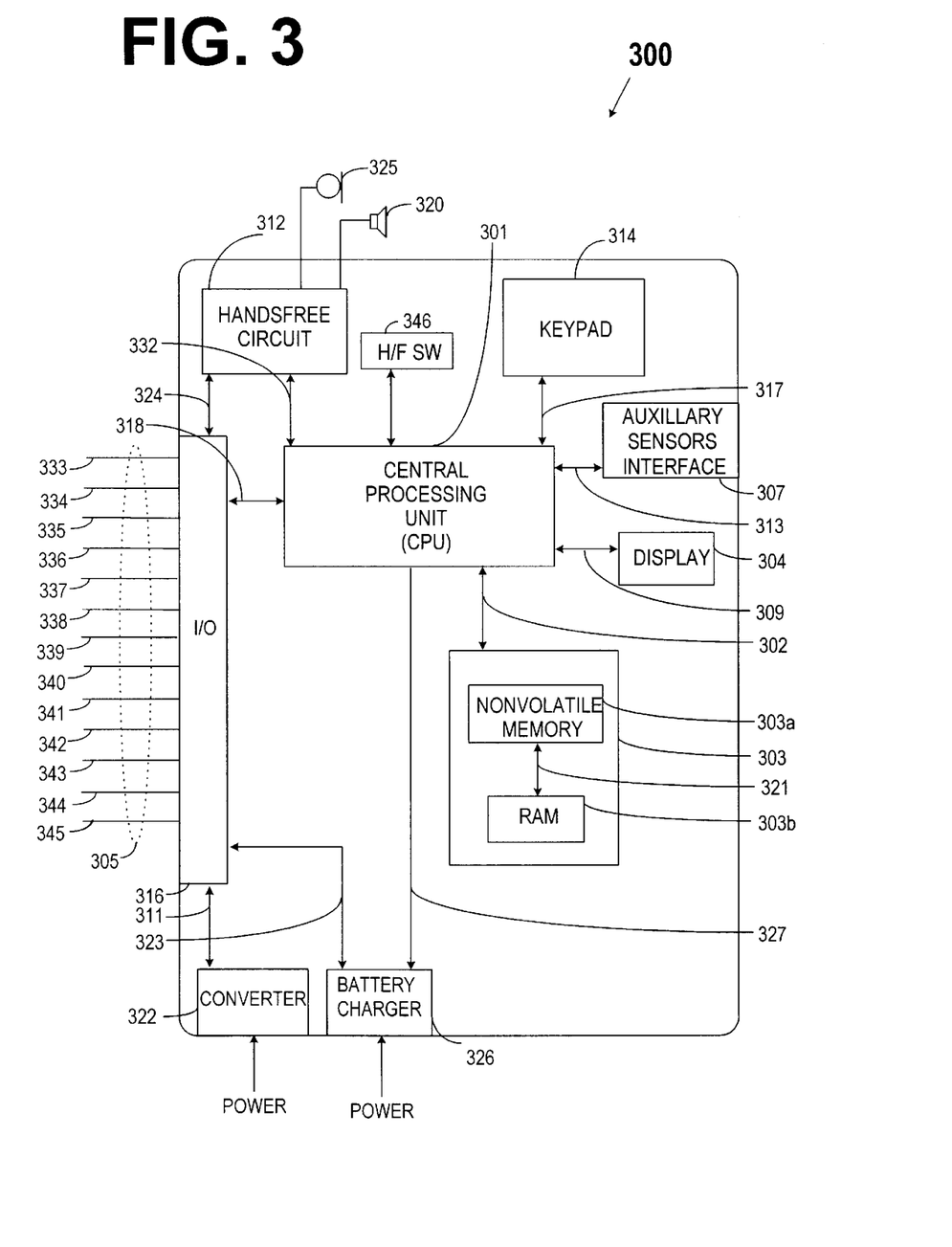
FIG. 3 is a block diagram representation of the host system of FIG. 1.

Reference is now made to FIG. 3 which schematically illustrates host system 300 in much greater detail. Host 300 includes, at least: i) CPU 301 which performs all processing for host 300 and which is coupled by line 302 to memory 303; ii) a display 304 coupled by line 309 to CPU 301 as an additional display to be viewed by a user during operation of the host system 300; iii) an auxiliary sensors interface 307 coupled by line 313 to CPU 301 for interfacing with auxiliary sensors 360 (in a navigation system, for example, auxiliary sensors 360 include, for example, a compass and an odometer tap); and iv) keypad 314 coupled to CPU 301 by line 317 to be used along with portable keypad 270 for operation of system 100. An I/O port 316 is coupled to CPU 301 by line 318 for coupling portable 200 to host 300 by line 305. In the first preferred embodiment, host 300 also includes a battery charger 326, which is a variable and rapid charging circuit that provides charging to a battery circuitry 299 (FIG. 4, discussed below) of portable 200 coupled through line 323, I/O port 316 and line 305. Battery charger 326 is capable of detecting a signal received from battery circuitry 299 (i.e., from a thermistor) of portable 200 which indicates that a portion of battery circuitry 299 has risen to a threshold temperature. This detection is done to control by CPU 301, which is coupled through line 327 to battery charger 326, the output of battery charger 326 to prevent any damage to a portion of battery circuitry 299.

The first preferred embodiment includes several additional components. One component of host 300 is a converter 322 which is coupled through line 311, I/O port 316, and line 305 to battery circuitry 299 of portable 200. Converter 322 is a DC-to-DC (e.g., 12 volts to 6 volts) converter which provides power to battery circuitry 299. Another component of host 300 in the first preferred embodiment is handsfree circuit 312 which provides echo canceling (and in some implementations, noise reduction), as in a speaker phone implementation, for audio signals passed between host 300 and microphone 325 and speaker 320. Handsfree circuit 312 is coupled through line 324, I/O port 316, and line 305 to portable 200 and is coupled to CPU 301 by line 332. Handsfree circuit 312 enables a user the comfort and convenience of not having to hold portable 200 during calls since the user may use microphone 325 and speaker 320. In the first preferred embodiment, the user uses handsfree circuitry 312, microphone 325, and speaker 320 of host 300 instead of the portable speaker and microphone circuitry 210 (FIG. 4) by attaching the portable 200 to the host 300 to activate an on-hook/off-hook switch 346, the movement of which is observed by the CPU 301 which notifies the handsfree circuit 312 and issues a forward data line notification to the portable 200 to cease use of the portable speaker and microphone circuitry 210. Still another component of host 300 is memory 303 which is coupled to CPU 301 through line 302. Memory 303 includes nonvolatile memory 303a and RAM 303b. Examples of nonvolatile memory 303a include EEPROM, a hard disk, a CD-ROM, battery-backed RAM, etc., although these examples should not be viewed as limiting in the present invention. Nonvolatile memory 303a and RAM 303b are coupled by line 321. Memory 303 is used for storing and running executable programming and at least data or databases for use by host 300 and system 100 as appropriate for designed applications.

Figure 4:
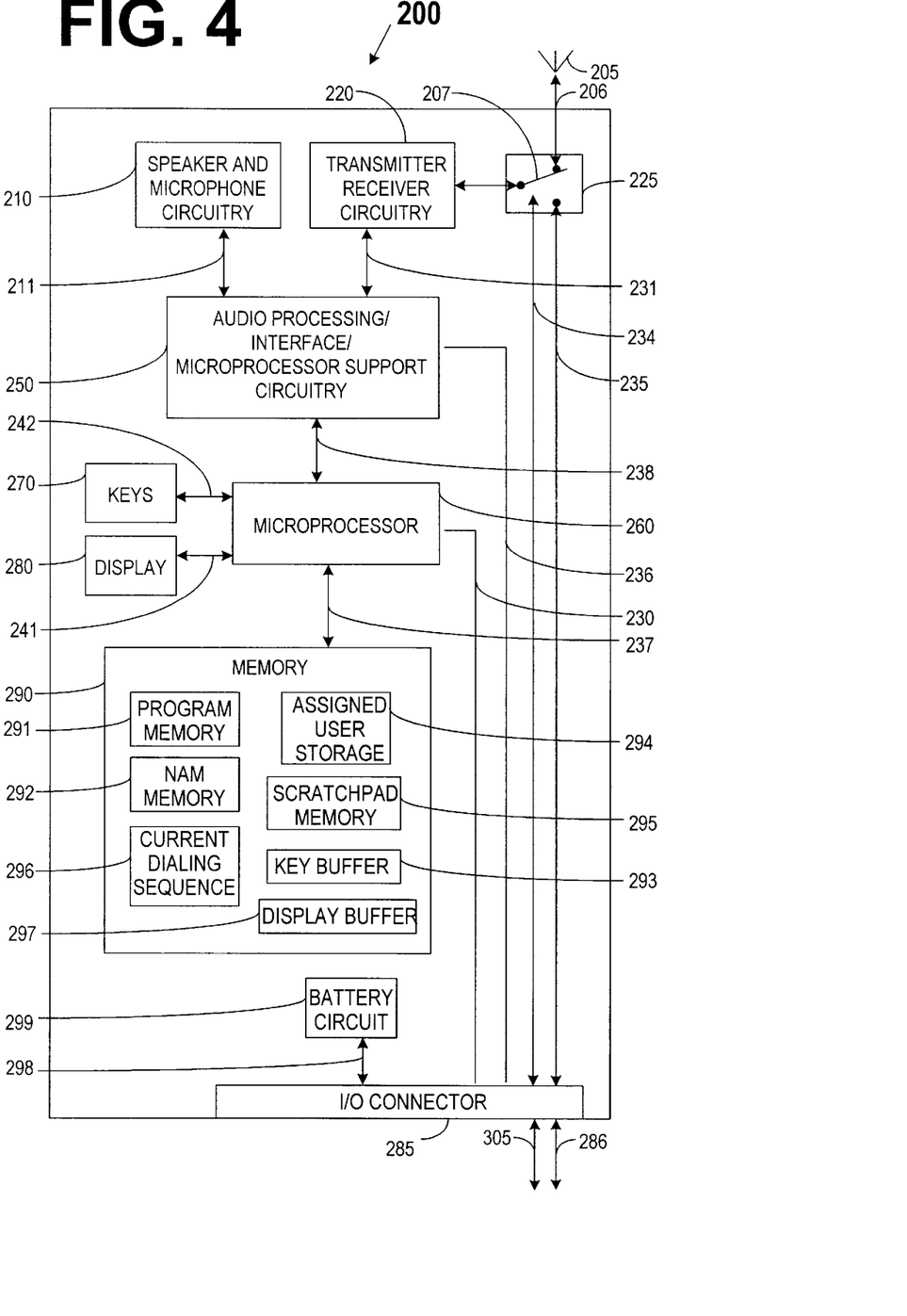
FIG. 4 is a block diagram representation of the portable of FIG. 1.

Attention is now directed to line 305 of the first preferred embodiment which is now discussed in more detail. As is schematically shown in FIG. 3, line 305 includes, at least, 13 lines 333–345 which are coupled to host 300 through I/O port 316. Although not specifically shown in FIGS. 1–4, it is to be understood that these, at least, 13 lines 333–345 are also coupled, in the first preferred embodiment, through I/O port 285 to portable 200 as will be described below. Line 333 couples the charge output from battery charger 326 of host 300 to battery circuitry 299 of portable 200 (FIG. 4). Line 334 couples the power from converter 322 of host 300 to battery circuitry 299 of portable 200. Line 335 couples audio signals from microphone 325 of host 300 to portable 200 to be transmitted. Line 336 is an analog ground and couples the chassis of portable 200 to ground. Line 337 couples received audio signals to the host 300 for being output through the speaker 320. Line 338 provides digital components of portable 200 a digital grounding reference. Line 339 couples portable 200 and host 300 to enable power to portable 200 to be controlled by a power on/off button on portable 200 and not one on host 300 (line 339 low) or vice versa (line 339 high) to enable the host 300 to even disable the power on/off button on portable 200. Line 340 couples a clock signal from portable 200 to host 300 to enable host 300 to detect that portable 200 is electronically coupled to host 300. Line 341 is the Forward Data Line and couples data and commands including Key Press, Key Release, and Display commands from host 300 to portable 200 (i.e., to microprocessor 260). Line 342 is the Reverse Data Line and couples data and commands including Key Press, Key Release, and Display commands and status information from portable 200 to host 300 (i.e., to CPU 301). Line 343 couples portable 200 to a digital ground on host 300 to enable portable 200 to detect that it is coupled to host 300. Line 344 couples the battery circuitry 299 temperature sensing (thermistor) signal to be detected by host 300 for control of battery charger 326 as discussed above. Finally, line 345 couples host 300 and RF relay 225 (FIG. 4) of portable 200 to switch RF relay 225 in accordance with designed applications of host 300 which require that RF transmission signals be transmitted or received through I/O port 285 of portable 200 instead of through antenna 205 of portable 200.

More detail is now provided on portable 200 according to the first preferred embodiment. Referring to FIG. 4, which schematically depicts portable 200, it is observed that portable 200 includes, at least, microprocessor 260, memory 290 having memory allocated for various functions (described in more detail below), keypad 270, display 280, audio processing/interface/microprocessor support circuitry 250, speaker and microphone circuitry 210, transmitter and receiver circuitry 220, RF relay 225, antenna 205, I/O port 285, and battery circuitry 299. Microprocessor 260 is coupled through line 237 to memory 290, through line 241 to display 280, through line 242 to keypad 270, through line 238 to audio processing/interface/microprocessor support circuitry 250, and through line 230 to I/O port 285. Battery circuitry 299 of portable 200 is coupled to I/O port 285 through line 298. It is to be understood, however, that to simplify the appearance of FIG. 4, all power lines connecting battery circuitry 299 to the various components of portable 200 which require power from battery circuitry 299 are not shown. Nevertheless, these power lines are certainly necessary and should be understood to be part of portable 200, although not specifically depicted in FIG. 4.

Continuing with the description of portable 200, audio processing/interface/microprocessor support circuitry 250 is further coupled through line 236 to I/O port 285, through line 231 to transmitter and receiver circuitry 220, and through line 211 to speaker and microphone circuitry 210. Transmitter and receiver block 220 is coupled through line 207 to RF relay 225 which alternates between connecting line 207 to line 206 coupled to portable antenna 205 and a connection to line 235 coupled through I/O port 285 and RF line 315 to antenna 330 (FIG. 2). The particular state of RF relay 225 at any given time is determined, as discussed above, in accordance with designed applications of host 300.

Consideration is now given to a more detailed description of memory 290 of portable 200 in the first preferred embodiment and as schematically illustrated in FIG. 4. It should be understood that, although not shown, in particular, in FIG. 4, memory 290 is meant to encompass all on-board memory of portable 200 associated with microprocessor 260 of portable 200. In FIG. 4, memory 290 includes several memories as indicated. In particular, memory 290 includes, at least, program memory 291, NAM (number assignment module) memory 292 which includes personal/vehicle options memory, key buffer memory 293, assigned user storage 294, scratch pad memory 295, current dialing sequence memory 296, and display buffer memory 297. Memories 291–297 include both nonvolatile and volatile memory. Program memory 291 stores executable programs which run, as determined by microprocessor 260, during any operation of portable 200. NAM memory 292 stores the telephone number for the portable 200, serial number information, personal & vehicle options, etc. Key buffer memory 293 stores key stroke information generated by the user hitting keys on keypad 270 on portable 200 and on keypad 314 of host 300. Assigned user storage 294 stores telephone numbers and names in a scrollable and individually addressable arrangement. Scratchpad memory 295 stores unassigned information in scrollable form. Current dialing sequence memory 296 temporarily stores a telephone number as it is being dialed in sequence. Display buffer memory 297 is used to store information to be displayed on the display 280 as received from the microprocessor 260 during non-TM modes of operation of the portable 200 and, during the TM mode, from the host 300.

Referring back to FIG. 2, it is to be understood that in the first preferred embodiment, one example of an acceptable host 300 is a navigation (guidance) system. An example of acceptable auxiliary sensors 360 includes a GPS (Global Positioning System) for determining the latitude and longitude (i.e., the global location) of the vehicle. Another acceptable example of a host 300 includes an automobile engine diagnostic system with auxiliary sensors 360 connected to a vehicular engine computer for ultimate communication through portable 200 to a remote engine diagnostic facility. Yet another example of an acceptable host 300 includes a voice adapter with voice recognition capabilities for a vehicular telephone system such that configuration of the adapter is facilitated through terminal mode. Still another example of an acceptable host includes a car stereo wherein the portable cellphone 200 acts as a "front end" to the audio system to select audio source (i.e., radio, tape, CD, etc.) and further operate the audio system. Thus, the scope of the present invention is intended to include systems with various types of hosts.

Figure 5:
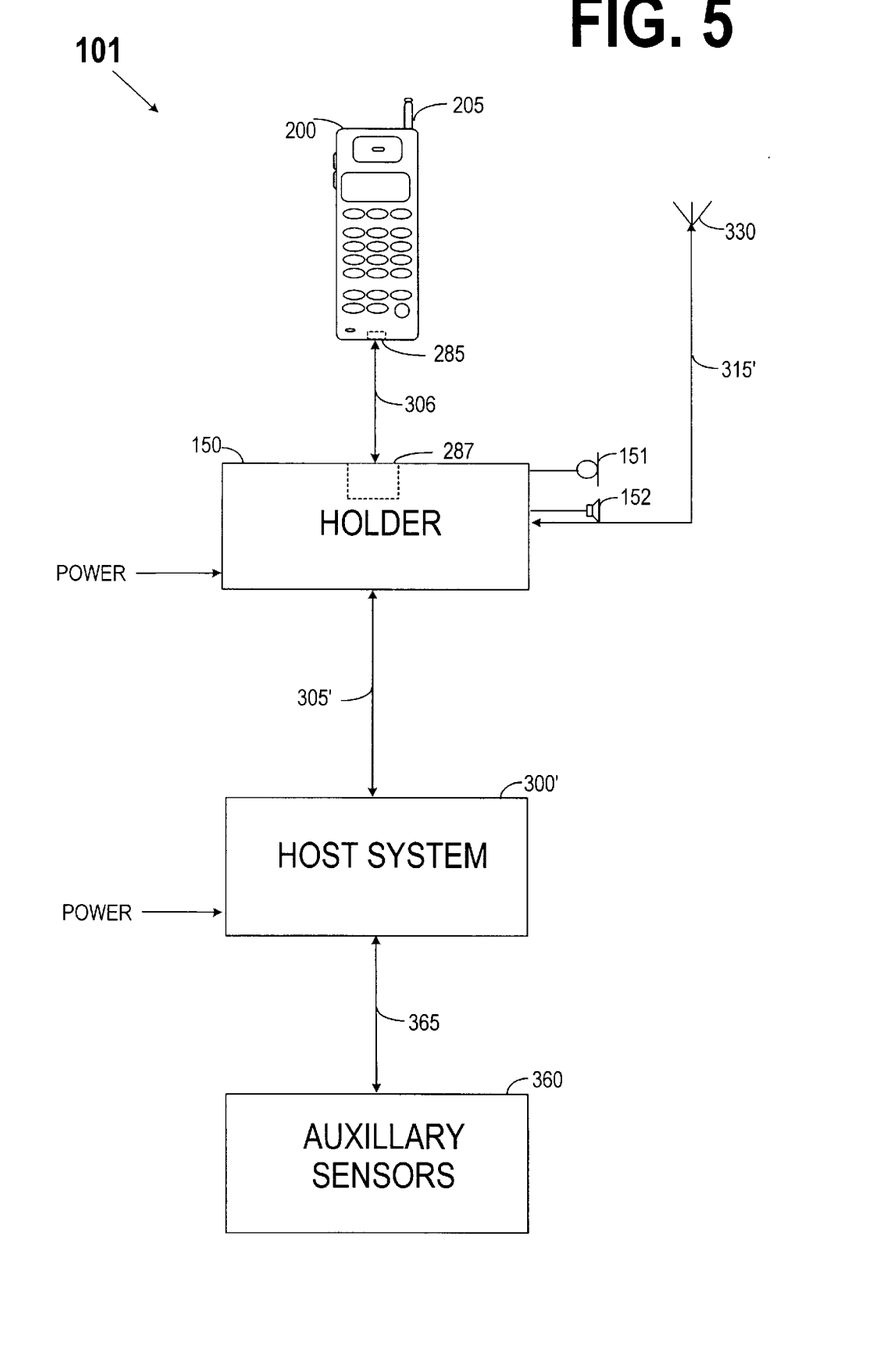
FIG. 5 schematically illustrates a system according to a second preferred embodiment of the present invention.

Reference is now made to FIG. 5 which schematically shows system 101 in accordance with a second preferred embodiment of the present invention. In FIG. 5, portable 200 is coupled to a holder 150 through I/O port 285, line 306, and I/O port 287 which is part of holder 150. I/O port 287 of holder 150 is similar to I/O port 285. Line 306 provides a combination function similar to previously described lines 305 and 286 of the first preferred embodiment, i.e., line 306 couples to the portable 200 RF signals lines, data signals lines, audio signals lines, power signal lines, etc. Holder 150 provides power through line 306 to battery circuitry 299 instead of host 300 providing power to portable 200. Since holder 150 has its own microphone 151 and speaker 152, holder 150, therefore, also includes handsfree circuitry as already discussed. As portable 200 is positioned in the receiving station of holder 150, a hook switch is thrown which grounds a circuit internal to the holder 150 which indicates to holder 150 that handsfree operation should be used. Note that in this second preferred embodiment, host 300 does not have speaker 320 and microphone 325, and thus does not include handsfree circuitry. Line 305' is similar to line 305 except line 305' does not need to couple power or audio signals between host 300' and portable 200 since power is coupled to portable 200 from holder 150 through line 306 and host 300' does not have a speaker or microphone in the second preferred embodiment. Also, in the second preferred embodiment, RF signals pass between portable 200 and antenna 330 through holder 150, and in so doing, pass through line 306 and through line 315'. Line 315' is similar to line 315 in that it is capable of propagating RF signals. In the second preferred embodiment, line 315' passes all the way through holder 150 to couple to I/O port 287 where line 306 is also coupled (not shown), although in other preferred embodiments, an intervening line coupled between line 315' and I/O port 287 may be employed (not shown).

Figure 6:
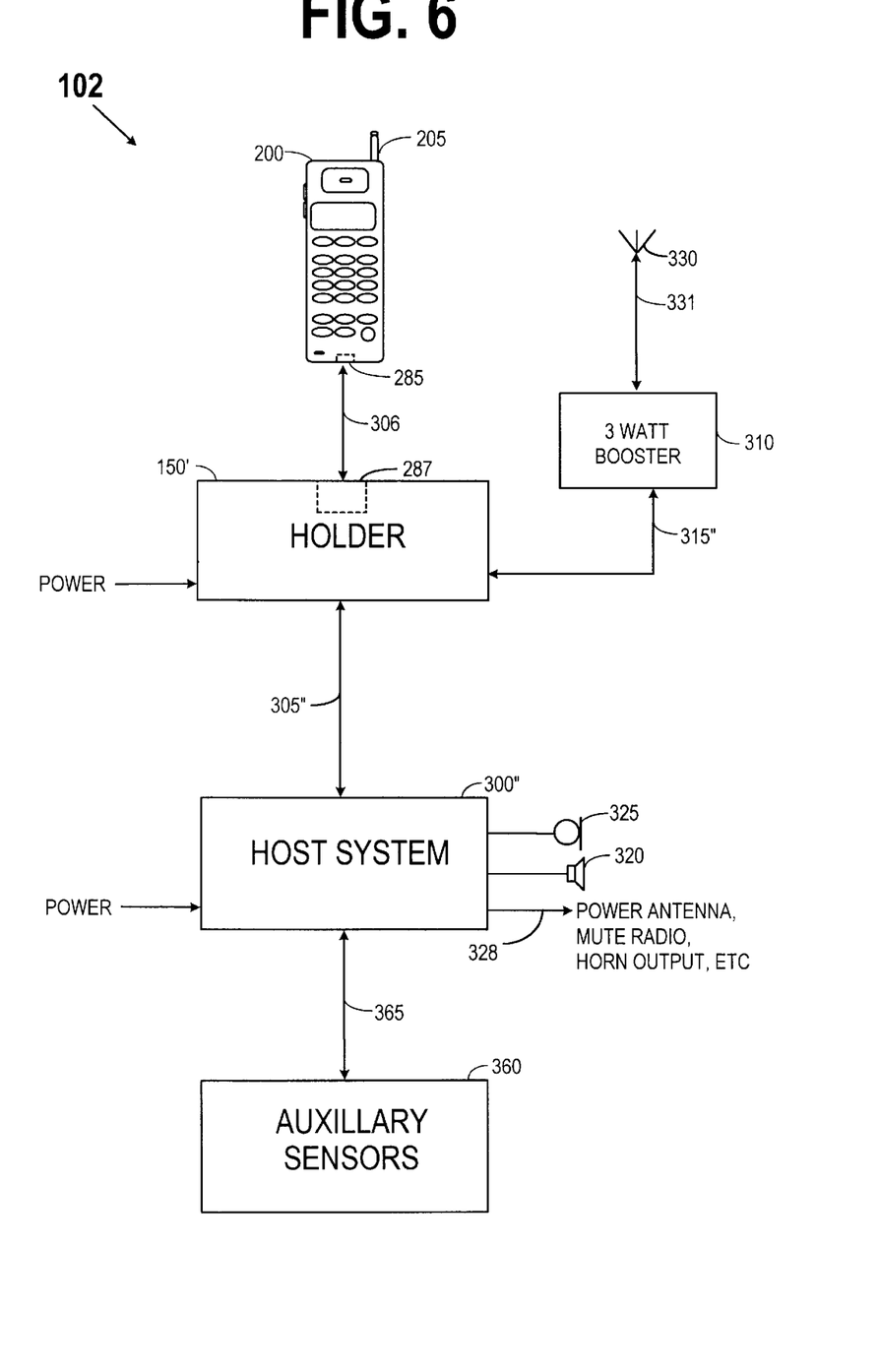
FIG. 6 schematically illustrates a system according to a third preferred embodiment of the present invention.

Attention is now directed to FIG. 6 which schematically illustrates system 102 which is a third preferred embodiment in accordance with the present invention. System 102 is similar to system 101 with some additional features. In system 102, RF or higher frequency line 315" is similar to RF line 315' except that it couples RF signals to a 3 Watt booster 310 for power amplification in transmission. In the third preferred embodiment, antenna 330 is coupled to power booster 310 by RF line 331 which is similar to line 315'. Line 305" is similar to line 305' in that line 305" does not couple power from host 300" to portable 200 since power is coupled from holder 150' to portable 200 through line 306. However, line 305" is also similar to line 305 in that line 305" couples audio signal between portable 200 and host 300" because host 300" has speaker 320 and microphone 325.

Figure 7:
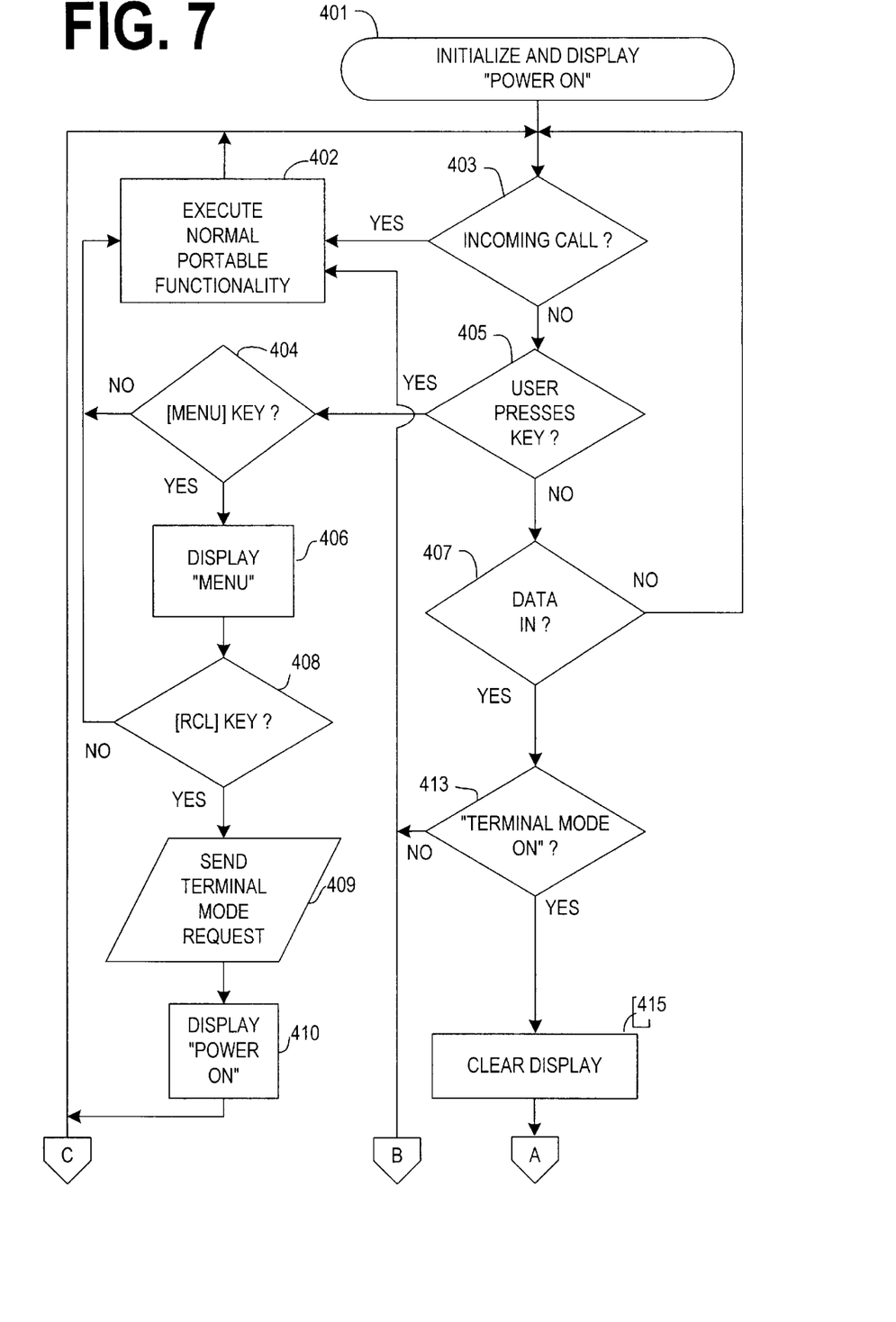
FIGS. 7–8 show a flow chart representation of a terminal mode of operation in context with other portable functions.
Figure 8:
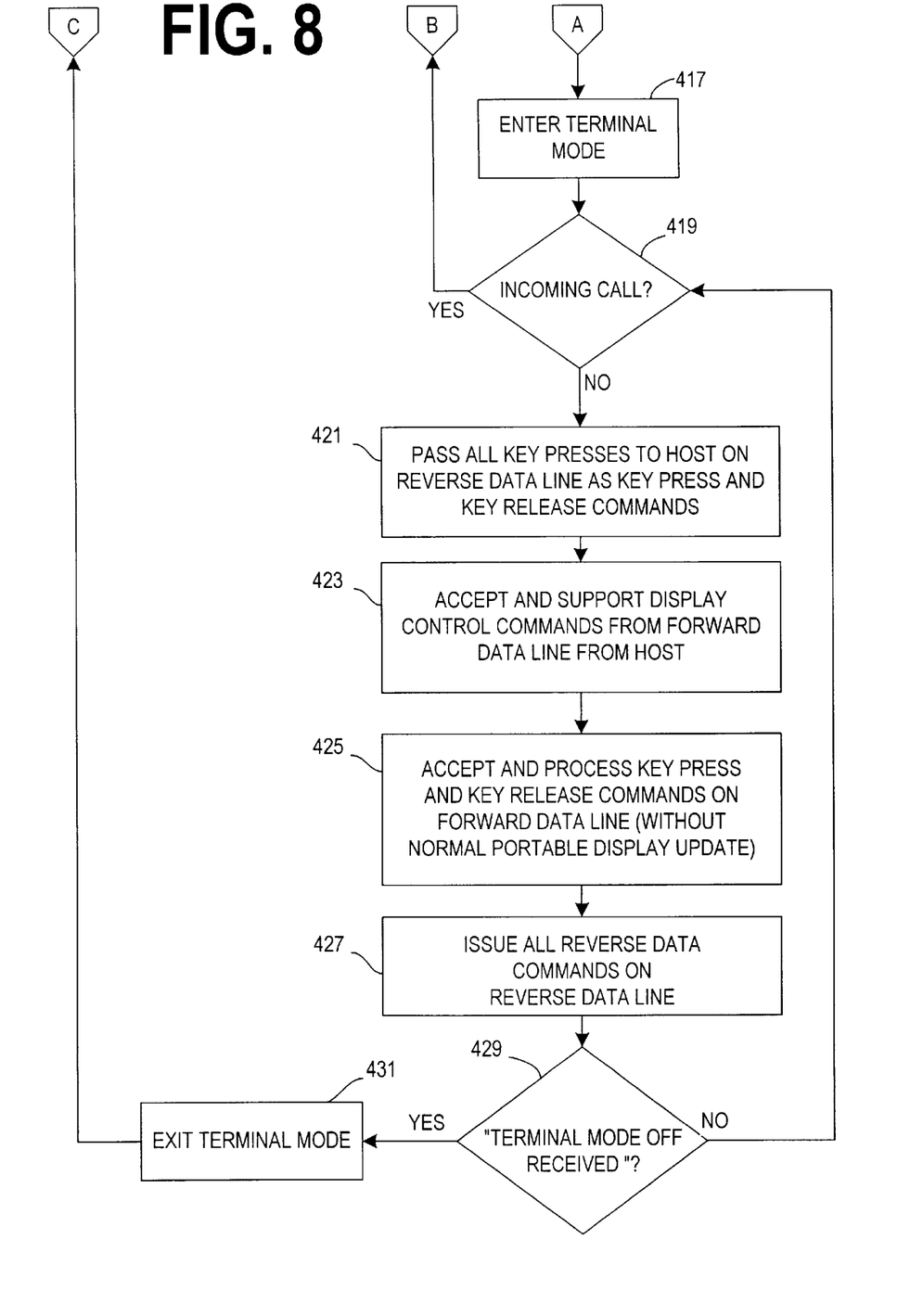

Reference is now made to the flow chart of FIGS. 7 and 8 which depicts the events that take place in the preferred embodiments in accordance with the present invention. Note that the flow chart of FIG. 8 is a continuation of the flow chart of FIG. 7. Upon power on of portable 200, for example by a user pressing a power button on portable 200, an initialization procedure is invoked and display 280 displays "power on" in step 401. After this initialization procedure is completed, portable 200 is ready (i.e., it is in a "ready" state) to receive instructions from the user and ready to receive any incoming calls. If an incoming call occurs in step 403 (or at any other time during operation of the portable 200), then portable 200 executes normal (conventional) functionality for handling an incoming call in step 402, and then, after conclusion of the incoming call, portable 200 returns to its ready state as just described subsequent to step 401. If, however, there is no incoming call in step 403 and the user presses a key on keypad 270, such an action is detected in step 405, after which it is determined in step 404 if the key pressed is the "menu" key. For the situation where the menu key has not been pressed, the user must be requesting to execute some of the normal functionality of portable 200, and portable 200 proceeds to step 402 for executing the normal functionality of portable 200, followed by return to its ready state subsequent to step 401. In the alternative situation where the "menu" key has been pressed by the user, display 280 is instructed to display "menu" and does so in step 406. If, after the menu key has been pressed, the "recall" key has not been pressed as determined in step 408, again the user must be requesting to execute some of the normal functionality of portable 200, and portable 200 proceeds to step 402 for executing its normal functionality followed by return to its ready state subsequent to step 401. On the other hand, in the event that the "recall" key is pressed, then it is determined in step 408 that the user wants to notify the host 300 that the user is requesting access to a host application via terminal mode (TM) operation. Accordingly, a TM request is sent over the reverse data line from portable 200 to host 300 in step 409. After the TM mode request is sent out in step 409, portable 200 again displays "power on" (step 410) and returns to its ready state subsequent to step 401. Upon receipt of a terminal request, host 300 may respond by issuing a "terminal mode on" or a "terminal mode off" command to portable 200 over the forward data line, or host 300 may do nothing since it may be performing some other function that does not require it to communicate with portable 200.

Now, when portable 200 is in its ready state subsequent to step 401, there is no incoming call (step 403), and the user has not pressed a key on keypad 270 (step 405), if portable 200 does not receive data in step 407, then portable 200 returns to its ready state. Alternatively, if data is received before step 407, then it is determined in step 413 whether or not the data received is a "TM on" command from host 300. For the situation where the data received is not a TM on command from host 300, then the portable 200 executes normal portable functionality and proceeds to step 402 and then back to its ready state once the normal portable 200 functions are concluded. The other possibility in step 413 is for a "TM on" command to be received from host 300, in which case, portable 200 clears the display in step 415 and enters the TM mode in step 417. In the TM mode, host 300 exerts independent control over keypad 270 and display 280 except for indicator (icon) functions of portable 200.

If an incoming call is received at any time while portable 200 is in TM mode, TM mode is aborted for portable 200 to receive the incoming call, and portable 200 proceeds to step 402 from step 419 for invoking normal portable functionality, followed by return to its ready state after conclusion of the incoming call. At this point, for portable 200 to return to TM mode, another "TM on" command must be received by portable 200 from host 300 over the forward data line. However, in the event that no incoming call is received by portable 200 at step 419 and portable 200 stays in TM, then portable 200 passes all key presses of keypad 270 to host 300 on the reverse data line as Key Press and Key Release commands in step 421. Also, in TM, portable 200: i) accepts and supports Display Control commands received from host 300 over the forward data line in step 423; ii) accepts and processes Key Press and Key Release commands on the forward data line (without normal portable display 280 update) in step 425; and iii) issues all normal Reverse Data commands on the reverse data line in step 427. If a "TM off" command is received by portable 200 from host 300 over the forward data line in step 429 while portable 200 is in TM, then portable 200 exits TM in step 431, and portable 200 returns to its ready state. On the other hand, if portable 200 does not receive a TM off command in step 429, then it continues to stay in terminal mode unless an incoming call is received (step 419) as discussed above, in which case TM mode is aborted and portable 200 proceeds to step 402 for executing cellphone normal functionality, followed by return to its ready state.

While the embodiments of the present invention which have been disclosed herein are the first preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should not be limited to the specific details disclosed herein.

I claim:

1. A portable cellular telephone method for controlling initiation and termination of a terminal mode of operation in a portable cellular telephone coupled to a host device, during which mode the host device receives keystroke information from the portable cellular telephone and sends display commands to the portable cellular telephone, said method comprising steps of:

monitoring a portable cellular telephone keypad to detect an indication from a user to request both initiation of terminal mode operation of the portable cellular telephone and suspension of normal portable cellular telephone display and keyboard input operations;

responsive to detecting the indication, sending out data to the host device notifying the host device that the user has requested access to a host application via the terminal mode of operation;

resuming normal portable cellular telephone operation subsequent to the preceding step of sending out data to the host device;

initiating the terminal mode of operation in the portable cellular telephone exclusively responsive to receiving a command from the host device to initiate the terminal mode of operation; and terminating the terminal mode of operation in the portable cellular telephone during any stage of the terminal mode of operation responsive to either the portable cellular telephone detecting an incoming cellular telephone call or the portable receiving a command from the host to terminate the terminal mode of operation.

2. The method of claim 1, wherein the host device includes a mobile navigational system.

3. The method of claim 1, wherein keystrokes detected on the portable cellular telephone keypad during the terminal mode of operation are forwarded to the host device.

4. The method of claim 3, wherein all of the keystrokes detected on the portable cellular telephone keypad during the terminal mode of operation are forwarded to the host device without affecting operation of the portable cellular telephone.

5. The method of claim 3, wherein keystrokes forwarded to the host device have no effect on operation of the portable cellular telephone.

6. The method of claim 1, wherein the portable cellular telephone continues processing keystroke commands received from external control units during the terminal mode of operation without displaying the results of such processing.

7. The method of claim 1, wherein the portable cellular telephone provides a radio frequency communication capability to the host device during the terminal mode of operation.

8. A portable cellular telephone operable alternately as a conventional cellular telephone and as a terminal for providing a user interface to a host device, said portable cellular telephone comprising:

means for changing from a conventional cellular mode of operation to a terminal mode of operation responsive to receiving a terminal mode initiation command from a host device;

means for forwarding keystroke data from said portable cellular telephone to the host device during the terminal mode of operation; and means for displaying on said portable cellular telephone information received from the host device during the terminal mode of operation.

9. The telephone of claim 8, further comprising means for communicating to the host device a request for host mode initiation, and means for delaying host mode initiation until receiving the terminal mode initiation command from the host device, during which time the conventional cellular mode of operation is maintained.

10. The telephone of claim 8, further comprising means for terminating the terminal mode of operation responsive to said portable cellular telephone receiving an incoming cellular telephone call.

11. The telephone of claim 8, wherein all of the keystrokes detected on the portable cellular telephone during the terminal mode of operation are forwarded to the host device without affecting operation of the portable cellular telephone.

12. The telephone of claim 8, wherein keystrokes forwarded to the host device have no effect on operation of the portable cellular telephone.

13. The telephone of claim 8, wherein the portable cellular telephone continues processing keystroke commands received from external control units during the terminal mode of operation without displaying the results of such processing.

14. The telephone of claim 8, wherein the portable cellular telephone provides a radio frequency communication capability to the host device during the terminal mode of operation.

* * * * *